United States Patent
Myhill

(10) Patent No.: US 11,266,915 B2
(45) Date of Patent: Mar. 8, 2022

(54) SYSTEMS AND METHODS FOR CREATING, BROADCASTING, AND VIEWING 3D CONTENT

(71) Applicant: Unity IPR ApS, Copenhagen (DK)

(72) Inventor: Adam Myhill, Mayne Island (CA)

(73) Assignee: Unity IPR ApS, Copenhagen (DK)

( * ) Notice: Subject to any disclaimer, the term of this patent is extended or adjusted under 35 U.S.C. 154(b) by 248 days.

(21) Appl. No.: 16/731,981

(22) Filed: Dec. 31, 2019

(65) Prior Publication Data

US 2020/0206640 A1 Jul. 2, 2020

Related U.S. Application Data

(63) Continuation of application No. 15/836,826, filed on Dec. 9, 2017, now Pat. No. 10,695,680.
(Continued)

(51) Int. Cl.
  *A63F 13/00* (2014.01)
  *A63F 13/86* (2014.01)
  (Continued)

(52) U.S. Cl.
  CPC ............ *A63F 13/86* (2014.09); *A63F 13/213* (2014.09); *A63F 13/30* (2014.09); *A63F 13/497* (2014.09); *A63F 13/52* (2014.09); *A63F 13/525* (2014.09); *A63F 13/60* (2014.09); *H04N 21/2353* (2013.01); *H04N 21/23424* (2013.01);
  (Continued)

(58) Field of Classification Search
  None
  See application file for complete search history.

(56) References Cited

U.S. PATENT DOCUMENTS 8,282,488 B2 10/2012 Walker et al.
8,491,391 B2 7/2013 Brunet De Courssou et al.
(Continued)

FOREIGN PATENT DOCUMENTS

CN 110121379 8/2019
EP 1300182 4/2003
(Continued)

OTHER PUBLICATIONS

US 10,549,205 B2, 02/2020, Myhill (withdrawn)
(Continued)

*Primary Examiner* — Paul A D'Agostino
(74) *Attorney, Agent, or Firm* — Shwegman Lundberg & Woessner, P.A.

(57) ABSTRACT

A method is disclosed for allowing a custom version of video session to be created for presentation on at least one viewer device. Game metadata generated from a live or recorded video feed is received. The game metadata includes three-dimensional modeling data associated with the live or recorded video feed. Viewer metadata collected from a plurality of viewer devices is received. The viewer metadata includes information pertaining to a plurality of responses of a plurality of viewers to a presentation of the video session on a plurality of viewer devices. Additional game metadata is created based on the game metadata and the viewer metadata. The additional game metadata includes camera data based on the three-dimensional modeling data. The additional game metadata is integrated into the game metadata for at least near-real-time presentation of the custom version of the video session.

20 Claims, 9 Drawing Sheets

Related U.S. Application Data

(60) Provisional application No. 62/551,130, filed on Aug. 28, 2017, provisional application No. 62/432,321, filed on Dec. 9, 2016.

(51) Int. Cl.

| | | |
|---|---|---|
| *A63F 13/525* | (2014.01) | |
| *A63F 13/52* | (2014.01) | |
| *A63F 13/497* | (2014.01) | |
| *A63F 13/60* | (2014.01) | |
| *A63F 13/213* | (2014.01) | |
| *A63F 13/30* | (2014.01) | |
| *H04N 21/234* | (2011.01) | |
| *H04N 21/235* | (2011.01) | |
| *H04N 21/258* | (2011.01) | |
| *H04N 21/4223* | (2011.01) | |
| *H04N 21/81* | (2011.01) | |
| *A63F 13/67* | (2014.01) | |

(52) U.S. Cl.
CPC ... *H04N 21/25891* (2013.01); *H04N 21/4223* (2013.01); *H04N 21/816* (2013.01); *H04N 21/8173* (2013.01); *A63F 13/67* (2014.09)

(56) References Cited

U.S. PATENT DOCUMENTS

| | | |
|---|---|---|
| 10,525,347 B2 | 1/2020 | Gary |
| 10,695,680 B2 | 6/2020 | Myhill |
| 2003/0038805 A1 | 2/2003 | Wong et al. |
| 2006/0148551 A1 | 7/2006 | Walker et al. |
| 2007/0050711 A1 | 3/2007 | Walker et al. |
| 2008/0274798 A1 | 11/2008 | Walker et al. |
| 2009/0082095 A1 | 3/2009 | Walker et al. |
| 2009/0208181 A1 | 8/2009 | Cottrell |
| 2010/0166056 A1 | 7/2010 | Perlman et al. |
| 2011/0281645 A1 | 11/2011 | Wolfson et al. |
| 2014/0181633 A1 | 6/2014 | Mo et al. |
| 2016/0109940 A1 | 4/2016 | Lyren et al. |
| 2018/0161682 A1 | 6/2018 | Myhill |

FOREIGN PATENT DOCUMENTS

| | | |
|---|---|---|
| EP | 1637197 | 3/2006 |
| EP | 2641166 | 9/2013 |
| JP | 2020515316 | 5/2020 |
| JP | 6746801 | 8/2020 |
| RU | 2719454 | 4/2020 |
| WO | 2007130691 | 11/2007 |
| WO | 2008/131278 A1 | 10/2008 |
| WO | 2015200737 | 12/2015 |
| WO | 2018104791 | 6/2018 |

OTHER PUBLICATIONS

US 10,596,470 B1, 03/2020, Myhill (withdrawn)
US 10,625,167 B2, 04/2020, Myhill (withdrawn)
US 10,668,389 B2, 06/2020, Myhill et al. (withdrawn)
"International Application Serial No. PCT/IB2017/001645, International Search Report dated Apr. 25, 2018", 6 pgs.
"International Application Serial No. PCT/IB2017/001645, Written Opinion dated Apr. 25, 2018", 6 pgs.
"International Application Serial No. PCT/IB2017/001645, International Search Report dated Sep. 19, 2018", 6 pgs.
"International Application Serial No. PCT/IB2017/001645, Written Opinion dated Sep. 19, 2018", 6 pgs.
"International Application Serial No. PCT/IB2017/001645, Written Opinion dated Jan. 16, 2019", 8 pgs.
"International Application Serial No. PCT/IB2017/001645, International Preliminary Report on Patentability dated Apr. 12, 2019", 9 pgs.
"U.S. Appl. No. 15/836,826, Non Final Office Action dated Jun. 26, 2019", 8 pgs.
"Chinese Application Serial No. 201780076310.3, Notice of Amendment dated Jul. 3, 2019", w/ English Translation, 2 pgs.
"U.S. Appl. No. 15/836,826, Response filed Aug. 30, 2019 to Non Final Office Action dated Jun. 26, 2019", 11 pgs.
"Chinese Application Serial No. 201780076310.3, Response filed Jul. 10, 2019 to Office Action dated Jul. 3, 2019", w/o English Translation, 5 pgs.
"U.S. Appl. No. 15/836,826, Notice of Allowance dated Sep. 25, 2019", 6 pgs.
"Chinese Application Serial No. 201780076310.3, Voluntary Amendment filed Nov. 29, 2019", w/ English Claims, 12 pgs.
"Russian Application Serial No. 2019121255, PPH Request filed Jan. 16, 2020", w/ English Claims, 14 pgs.
"Japanese Application Serial No. 2019-551761, Voluntary Amendment filed Jan. 20, 2020", w/ English Claims, 13 pgs.
"European Application Serial No. 17840570.0, Response to Communication pursuant to Rules 161(2) and 162 EPC filed Jan. 30, 2020", 20 pgs.
"U.S. Appl. No. 15/836,826, Corrected Notice of Allowability dated Feb. 27, 2020", 3 pgs.
"U.S. Appl. No. 15/836,826, Supplemental Notice of Allowability dated Mar. 18, 2020", 3 pgs.
"Russian Application No. 2019121255, Decision to Grant dated Feb. 27, 2020", w/ English Translation, 22 pgs.
"U.S. Appl. No. 15/836,826, Supplemental Notice of Allowability dated May 5, 2020", 3 pgs.
"Canadian Application Serial No. 3,046,417, Office Action dated May 6, 2020", 5 pgs.
U.S. Appl. No. 15/836,826 U.S. Pat. No. 10,695,680, filed Dec. 9, 2017, Systems and Methods for Creating, Broadcasting, and Viewing 3D Content.
"Canadian Application Serial No. 3,046,417, Response filed Sep. 4, 2020 to Office Action dated May 6, 2020", 16 pgs.
"Canadian Application Serial No. 3,046,417, Office Action dated Nov. 4, 2020", 3 pgs.
"Brazilian Application Serial No. BR 112019011452-1, Voluntary Amendment filed Dec. 3, 2020", with machine English translation, 121 pages.
"Canadian Application Serial No. 3,046,417, Response filed Feb. 8, 2021 to Office Action dated Nov. 4, 2020", 16 pgs.
"European Application Serial No. 17840570.0, Communication Pursuant to Article 94(3) EPC dated Mar. 19, 2021", 7 pgs.

SYSTEMS AND METHODS FOR CREATING, BROADCASTING, AND VIEWING 3D CONTENT

CROSS-REFERENCE TO RELATED APPLICATIONS

This application is a continuation of and claims the benefit of priority under 35 U.S.C. § 120 to U.S. patent application Ser. No. 15/836,826, filed on Dec. 9, 2017, which claims the benefit of U.S. Provisional Patent Application Ser. No. 62/432,321, filed Dec. 9, 2016, and U.S. Provisional Patent Application Ser. No. 62/551,130, filed Aug. 28, 2017, each of which is incorporated by reference herein in its entirety.

TECHNICAL FIELD

Embodiments of the present disclosure relate generally to multi-player computer gaming and, more specifically, to systems and methods for creating, broadcasting, and viewing 3D content.

BACKGROUND

Various tools exist to allow video game players to play online multiplayer games in real time whereby a plurality of video game players distributed over a network interact within the same video game at the same time. Furthermore, there are tools that exist for non-playing users to watch the game and broadcast their view of the game along with commentary. These non-playing users are referred to as "hosts" or "casters" and their broadcast is a casting of the game. Many third parties can tune in and watch the casted games via websites such as Twitch® and YouTube®.

Unfortunately for the third-party viewers, the cinematographic quality of the broadcast is often very poor with respect to camera stability, shot composure, camera cuts, and more. The casters often have no training in cinematography and have very limited tools at their disposal for capturing the game action. The most popular tool is a camera controlled by a computer mouse, but this tool often provides choppy visuals. More often, the caster has no control whatsoever of the view and must create the cast using the player camera (e.g. the camera view used by the player at any given moment), which is very difficult to watch. Viewers watching action directly from the game (e.g. without a caster) have no choice but to watch from one of the player cameras. Furthermore, another shortcoming of traditional game broadcasts is that the output is a standard video stream viewable on standard video players which do not have any ability to control cinematography or provide meaningful viewer feedback beyond 'views', 'likes' and comments.

BRIEF DESCRIPTION OF THE DRAWINGS

Various ones of the appended drawings merely illustrate example embodiments of the present disclosure and cannot be considered as limiting its scope. Further features and advantages of the present disclosure will become apparent from the following detailed description, taken in combination with the appended drawings, in which.

The headings provided herein are merely for convenience and do not necessarily affect the scope or meaning of the terms used. Like numbers in the Figures indicate like components.

DETAILED DESCRIPTION

Figure 1:
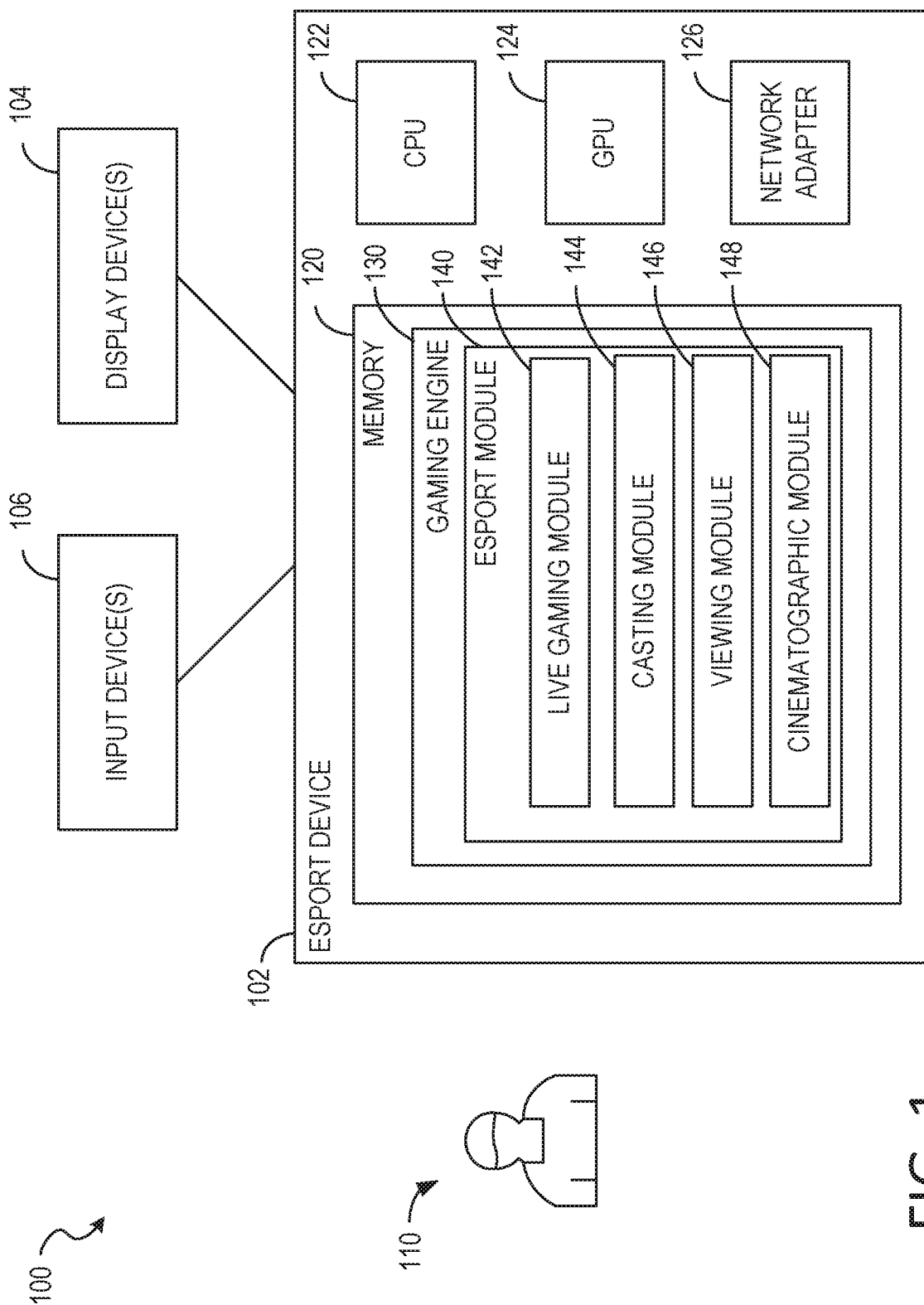
FIG. 1 is a component diagram of an example eSport system that includes an eSport device and associated peripherals, in accordance with an embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The systems and methods described herein provide a means to create high cinematic quality video output from a game environment in real-time (or at least near-real-time) wherein the video output contains metadata that can be used by the viewer to enrich the viewing experience. Furthermore, the systems and methods provided herein describe a player component configured to display the game broadcasts to viewers, provide them tools to allow them to interact with the metadata, and gather data from viewers to provide feedback for the game and the game caster in real time The systems and methods described herein allow a caster to create game broadcasts in real-time from the game environment that leverage audio, video, and game metadata to provide a high cinematographic quality and enrich the viewing experience. Furthermore, the systems and methods provided herein describe a viewing module configured to display the game broadcasts to viewers, provide the viewers tools to allow them to interact with the metadata, and gather data from viewers to provide feedback for the game and the game caster in real time. In accordance with another embodiment, the viewing module is configured to display a previously recorded game or previously recorded broadcast of a game, provide the viewer with tools to allow them to interact with the metadata, and gather data from the viewer to provide feedback for the game. In accordance with another embodiment, the viewing module is configured to display a 3D environment (e.g. from 3D environment data), provide the viewer with tools to allow them to interact with the metadata and the 3D environment, and gather data from the viewer to provide feedback for the generator of the 3D environment data. The 3D environment data can include live 3D model data, live 3D rendering (e.g. live 3D photogrammetry) of a real world environment, previously recorded 3D model data, and previously recorded 3D rendering (e.g. recorded 3D photogrammetry) of a real world environment. Throughout the description herein the term eSport refers in general to 3D content, which includes data for networked multiplayer games generated in real time whereby a plurality of video game players distributed over a network interact within the same video game at the same time (e.g. amateur online gaming and competitive professional online gaming), and the term includes 3D environment data.

FIG. 1 is a component diagram of an example eSport device 102 and associated peripherals. In the example embodiment, the eSport device 102 is a computing device operated by a user 110. The user 110 may be a player of an online multi-player game (e.g., an eSports game), or a broadcasting caster (or just "caster") that provides various broadcast functions associated with the eSport game, or a third-party viewer of the broadcast. The eSport device 102 includes one or more display devices 104 (e.g., conventional computer monitors, VR wearable devices, and so forth) and one or more input devices 106 (e.g., keyboard, mouse, handheld or wearable pointing devices, camera device, motion tracking device, and so forth). The-eSport device 102 also includes a memory 120, one or more central processing units (CPUs) 122, one or more graphics processing units (GPUs) 124, and one or more network adapters 126 (e.g., wired or wireless network adapters providing network connectivity used for the eSport game).

In the example embodiment, the eSport device 102 includes a gaming engine 130 (e.g., executed by the CPU 122 or GPU 124) that presents the eSport game to the user 110. The gaming engine 130 includes an eSport module 140 that provides various broadcast functionality for the eSport game as described herein. The eSport module 140 includes a live gaming module 142, a casting module 144, a viewing module 146, and a cinematographic module 148, each of which are implemented within, or otherwise in communication with, the gaming engine 130. Each of the live gaming module 142, the casting module 144, the viewing module 146, and the cinematographic module 148, as well as the gaming engine 130 include computer-executable instructions residing in the memory 120 that are executed by the CPU 122 or the GPU 124 during operation. The gaming engine 130 communicates with the display devices 104 and also with other hardware such as the input device(s) 106. The live gaming module 142, the casting module 144, the viewing module 146, and the cinematographic module 148, or the eSport module 140 overall, may be integrated directly within the gaming engine 130, or may be implemented as an external piece of software (e.g., a plugin or other independent software). In addition, although the live gaming module 142, the casting module 144, the viewing module 146, and the cinematographic module 148 are shown as distinct modules in FIG. 1, in practice these modules can be combined in any way and may not be implemented as discrete code modules but integrated directly within the code for the gaming module.

In the example embodiment, the live gaming module 142 provides a series of tools with which the user 110 can watch and participate in a live or recorded online video game session (or just 'eSport session') and a live or recorded real world session or event with 3D environment data (e.g. a real-life recorded football game with real-time photogrammetry), with one or more other users 110 and it provides functionality for the eSport system as described herein. In accordance with an embodiment, the-casting module 144 provides a set of tools with which the user 110 can record and broadcast (e.g. including metadata) aspects of the online eSport session (or recorded eSport session) according to the eSport system as described herein. The user 110 (e.g. caster) can be either a full participant in the eSport game, or be a viewer of the eSport game. The metadata includes data that can be used by the live gaming module 142 and the viewing module 146 to provide functionality to the user 110 as described herein. The casting module 144 may also provide the user 110 with cinematography tools (e.g. using the cinematographic module 148) in order to allow the user to control one or more cameras using advanced camera techniques.

In accordance with an embodiment, the viewing module 146 provides the user 110 with tools for displaying and interacting with game data from the online eSport session (or recorded eSport session), including data and video from the session created by other users 110 (e.g., using the casting module 144, the viewing module 146, the cinematographic module 148 or the live gaming module 142) and for collecting viewer metadata from the user 110 during viewing (e.g., including real-time data regarding actions or behavior of the user, such as game level being viewed, game object(s) being viewed, camera being used for viewing, event being followed, duration of viewing from a specific camera and from a specific camera angle, player being viewed, battle being viewed, shot composure, mouse position, and more). From this viewer data, the eSport module can determine which cameras the viewers prefer, how fast they switch cameras, what angles they prefer for the start of game vs. the end of game, and what angles they prefer when any given scenario is happening. The collected viewer data may be referred to herein as "viewer metadata". In some embodiments, the viewing module 146 may utilize a camera device (not separately depicted) to capture a video feed of the user 110 (e.g., a viewer of the broadcast content) and track eye movement and head movement of the user 110 during game play (e.g., approximating where the viewer is focusing their eye(s) at any given time) in order to add the video feed and/or the tracked eye movement data to the viewer metadata. In accordance with some embodiments, the tracked eye movements or head movements can be used to control a camera within the eSport session to enable a head tracking camera mode similar to a virtual reality head mounted display device or an augmented reality head mounted display device which gives the user the ability to directly control a camera movement with a head (or eye) movement. In some embodiments, the viewing module 146 may analyze the video feed of the viewer to determine facial expressions of the viewers during game play. Such viewer metadata may be transmitted back to an eSport device 102 used by a player in the eSport session, and may be presented to the player in order to inform the player about the viewer (e.g., to inform the player that 30% of the viewers are watching his battle, or that a viewer watches player 'X' the most, or that the viewer prefers to watch the battles from a drone camera, or that the viewer switches camera views with an average time interval of 'Y' seconds), or that the user had a specific reaction (e.g., surprise, horror, amusement, sadness, and so on). In some embodiments, viewer metadata may be transmitted via the network to a central repository (e.g. a database not separately shown in the figure) for storage and later use (e.g., by advertisers and developers). In some embodiments, the viewing module 146 may capture, record, and timestamp viewer metadata, game data and camera metadata. In accordance with an embodiment, the timestamped viewer metadata is aligned with the timestamped game data and camera metadata. The timestamped data may later be used by developers or advertisers to determine relationships between the data including defining capture windows for any given response (e.g., a query such as 'what was in the metadata stream one second on either side of X response?', where 'X' represents any measurable viewer response, could be sent to a database containing the timestamped data) and viewer reactions to specific game events, camera events, and caster actions.

In accordance with an embodiment, the cinematographic module 148 provides the live gaming module 142, the casting module 144, and the viewing module 146 with a set of cinematographic tools to display and record the online eSport session. Details of how the cinematographic module 148 provides the tools is provided herein with the description of the eSports system. In accordance with an embodiment, the cinematographic tools include tools to create, position, orient and change the properties of virtual cameras in the game environment. The tools can include a graphical user interface for users to control cinematographic features implemented by the cinematographic module 148, an auto cinematography tool for performing part or all of the cinematography functions in an automated way, and a set of cinematography features (e.g. via an application interface or API), as well as a tool for creating and embedding cinematography metadata in a device output. In accordance with an embodiment, the cinematographic tools work on high level mechanisms which enable desired shots without a user directly animating the camera (e.g via joystick or mouse). The mechanisms include procedural composition, shot evaluation, collision avoidance and dynamic follow behaviors.

Figure 2A:
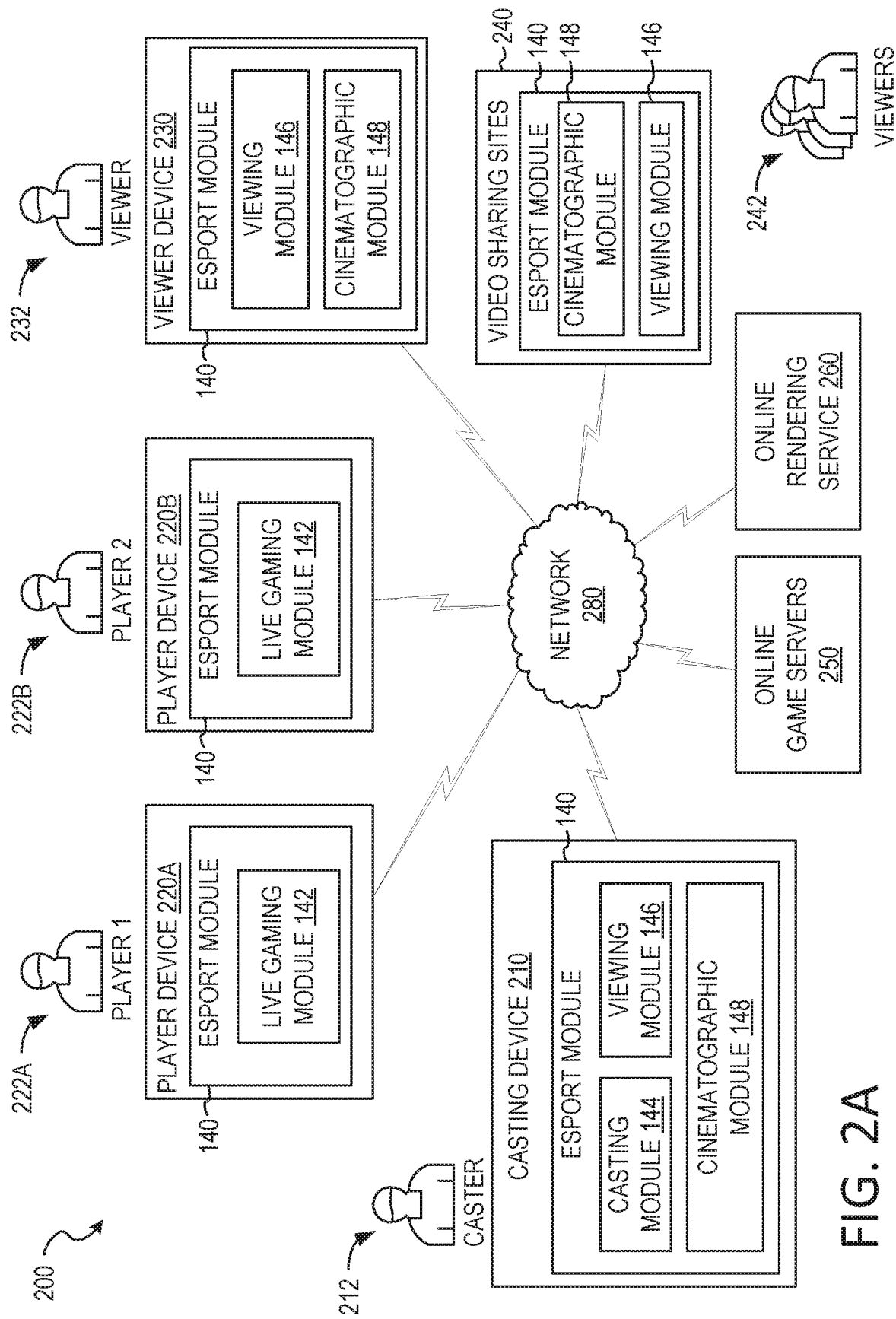
FIG. 2A illustrates the eSport system in an example network over which an online multiplayer computer game (e.g., an eSport game) is provided, in accordance with an embodiment.

FIG. 2A illustrates the eSport system 200 in an example network 280 over which an online multiplayer computer game (e.g., an eSport game) is provided. In the example embodiment, the eSport system 200 includes a casting device 210, two player devices 220A, 220B (collectively, player devices 220), a viewer device 230, video sharing sites 240, online game servers 250, and an online rendering service 260, each communicating in the shared network 280 (e.g., the Internet). The network 280 including wired and wireless networks. The casting device 210, the player devices 220, and the viewer device 230 may be similar to the eSport device 102. The number of game players, casters, and viewers may vary. The online game servers 250 include a server gaming module (not separately shown in the figure) which can be similar to the gaming engine 130 but which is specifically configured for providing game server functionality. The online rendering service 260 may be an internet based service providing graphics rendering services also known as a cloud rendering or render farm.

In the example embodiment, when the eSport session is an online video game, the online game may be set up using a client-server methodology for online games wherein the online game server 250 runs an authoritative version of the game and the client (e.g., the live gaming module 142 on the player devices 220) runs a local version of the game (e.g., via the gaming engine 130). The player devices 220 and game server 250 communicate over the network 280 exchanging game data during the eSport session to create a real-time game environment for players 222A, 222B (collectively, players 222). The online game servers 250 collect game data from all players 222 via the live gaming module 142 of the player devices 220 and may have an authoritative version of the game. The live gaming module 142 client runs a local version of the game (e.g. on each player device) and accepts data from the game server 250 (e.g. including the game data from other players 222) to update the local version of the game using the server data as the authoritative version such that the server data overrides local data in case of a discrepancy.

In the example embodiment, the modules of the eSport module 140 that are active on each of the devices 210, 220, 230 are shown in FIG. 2A for purposes of illustrating primary functions of the devices 210, 220, 230. It should be understood, however, that any of the various modules described herein may be operating on any of the devices 210, 220, 230. For example, during operation, the player devices 220A, 220B are operated by players 222A, 222B, respectively, while playing the eSport game, and the live gaming module 142 is active on each device (e.g. to communicate with the online game servers 250 and provide the player 222 with the game environment and to allow the player 222 to interact with the game). A caster 212 operates the casting device 210 to provide broadcast content for the eSport game (e.g., for various viewers 232, 242), and the casting module 144, the viewing module 146, and the cinematographic module 148 are active on the casting device 210. The casting module 144, viewing module 146 and cinematographic module 148 are active in order to provide the caster with the tools to create the broadcast content. The viewer 232 operates the viewer device 230 to consume the broadcast content generated by the caster 212 via the viewing module 146 and the cinematographic module 148 active on the viewer device 230. The viewing module 146 and cinematographic module 148 are primarily active in order to provide the viewer 232 with a view of the game and some cinematic control of the cameras.

This is similar to viewers 242 watching from video sharing sites 240. In the example embodiment, broadcast content provided by the caster 212 (e.g. via the casting device 210) may be presented to viewers 242 via various video sharing sites 240. Video sharing sites 240 may include online content providers such as YouTube®, Twitch®, or other such video sharing websites. As shown in FIG. 2A, the video sharing sites 240 may also include the eSport module 140 or components of the eSport module 140, such as the viewing module 146 or the cinematographic module 148, that may be used to present the broadcast content and other functionality to the viewers 242. For example, the cinematographic module 148 may be implemented within the video sharing site 240 (e.g., as a plugin) in order to provide the viewers 242 with cinematographic tools to control the viewing of an eSport game. In some embodiments, the viewing tools and cinematographic tools would only be visible in the user interface of the video sharing site 240 if the game metadata is present in the video content to be displayed. The cinematographic module 148 uses the game metadata to execute the cinematographic functionality. In accordance with an embodiment, the viewing module 146 in the eSport module 140 on a video sharing site 240 may perform some or all of the rendering locally on the user's device. In accordance with another embodiment, the cinematographic viewing choices of the user are rendered remotely (e.g., in a cloud rendering service) and as needed (e.g., on the fly), and the rendered video is sent to the user via a video sharing site 240. In accordance with still another embodiment, a fixed number of procedural cameras are active within the eSport session (recorded or live eSport session) and the view from each procedural camera is rendered remotely (e.g., in a cloud rendering service) and sent to the video sharing site 240 as a rendered video stream so that the viewer can choose (e.g., with the viewing module 146 or the cinematographic module 148) which of the rendered video streams to watch. Having procedural cameras with cloud rendering allows devices with poor rendering ability (e.g., mobile phones or old computers) to see high render quality while still controlling the cameras.

Figure 2B:
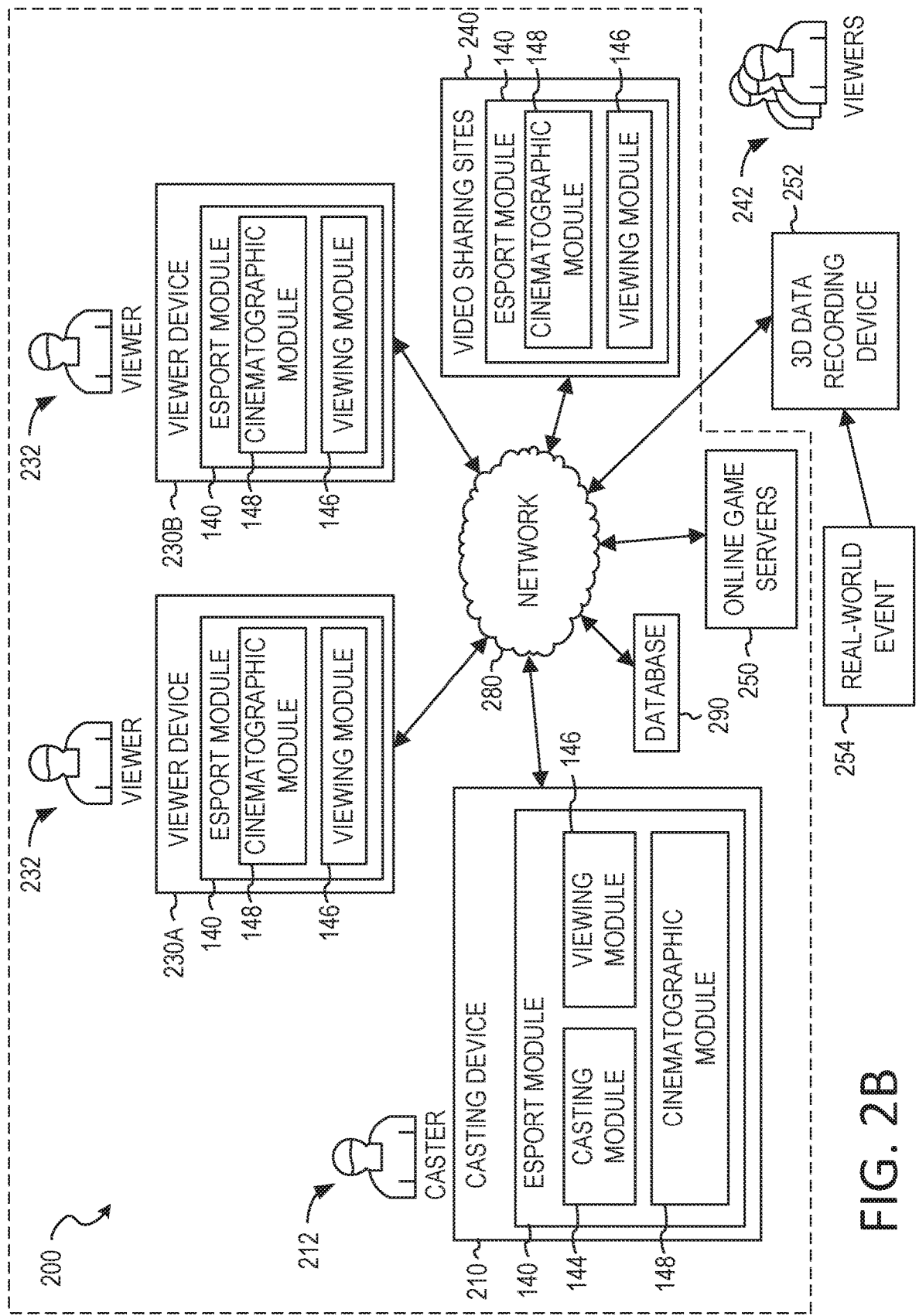
FIG. 2B illustrates the eSport system in an example network over which a broadcast of a real-world event is provided, in accordance with an embodiment.

FIG. 2B illustrates the eSport system 200 in an example network 280 over which a real-world event (e.g., a live or recorded sporting event, or a live or recorded non-sporting event) is provided. In the example embodiment, the eSport system 200 includes a casting device 210, two viewer devices 230A, 230B (collectively, viewer devices 230), online game servers 250, and a database 290, each communicating in the shared network 280 (e.g., the Internet). The eSport system 200 is connected to an external 3D video recording system 252 which provides 3D data and video from the real world event 254. The casting device 210, and the viewer device 230 may be similar to the eSport device 102. The number of casters 210 and viewers (232, 242) may vary. The online game servers 250 include a server gaming module (not separately shown in the figure) which can be similar to the gaming engine 130 but which is specifically configured for providing game server functionality such as broadcasting the 3D data from a live or recorded event. The 3D video recording system 252 is configured to generate 3D environment data from a real-world event 254 to be broadcast to viewers and casters 210 via the online game servers 250. The 3D video recording system 252 is also configured to record the 3D environment data in the database 290 for later re-broadcasting. The 3D video recording system 252 can generate the 3D environment data in many ways; for example, the system 252 can use one or more special cameras to directly record 3D data from the environment or use a plurality of standard video cameras to record the event 254 from different angles and then use a method to generate 3D data from the multiple video streams.

In the example embodiment, the modules of the eSport module 140 that are active on each of the devices 210, 230, and 240 are shown in FIG. 2B for purposes of illustrating primary functions of the devices 210, 230, 240. It should be understood, however, that any of the various modules described herein may be operating on any of the devices 210, 230, 240. For example, during operation, a caster 212 operates the casting device 210 to provide broadcast content for the eSport session (e.g., for various viewers 232, 242), and the casting module 144, the viewing module 146, and the cinematographic module 148 are active on the casting device 210. The casting module 144, viewing module 146 and cinematographic module 148 are active in order to provide the caster with the tools to create the broadcast content. The viewer 232 operates the viewer device 230 to consume the broadcast content generated by the caster 212 and directly from the online servers 250, and the viewing module 146 and the cinematographic module 148 are active. The viewing module 146 and cinematographic module 148 are primarily active in order to provide the viewer 232 with a view of the real world event 254 and some cinematic control of the cameras. This is similar to viewers 242 watching from video sharing sites 240.

Figure 3A:
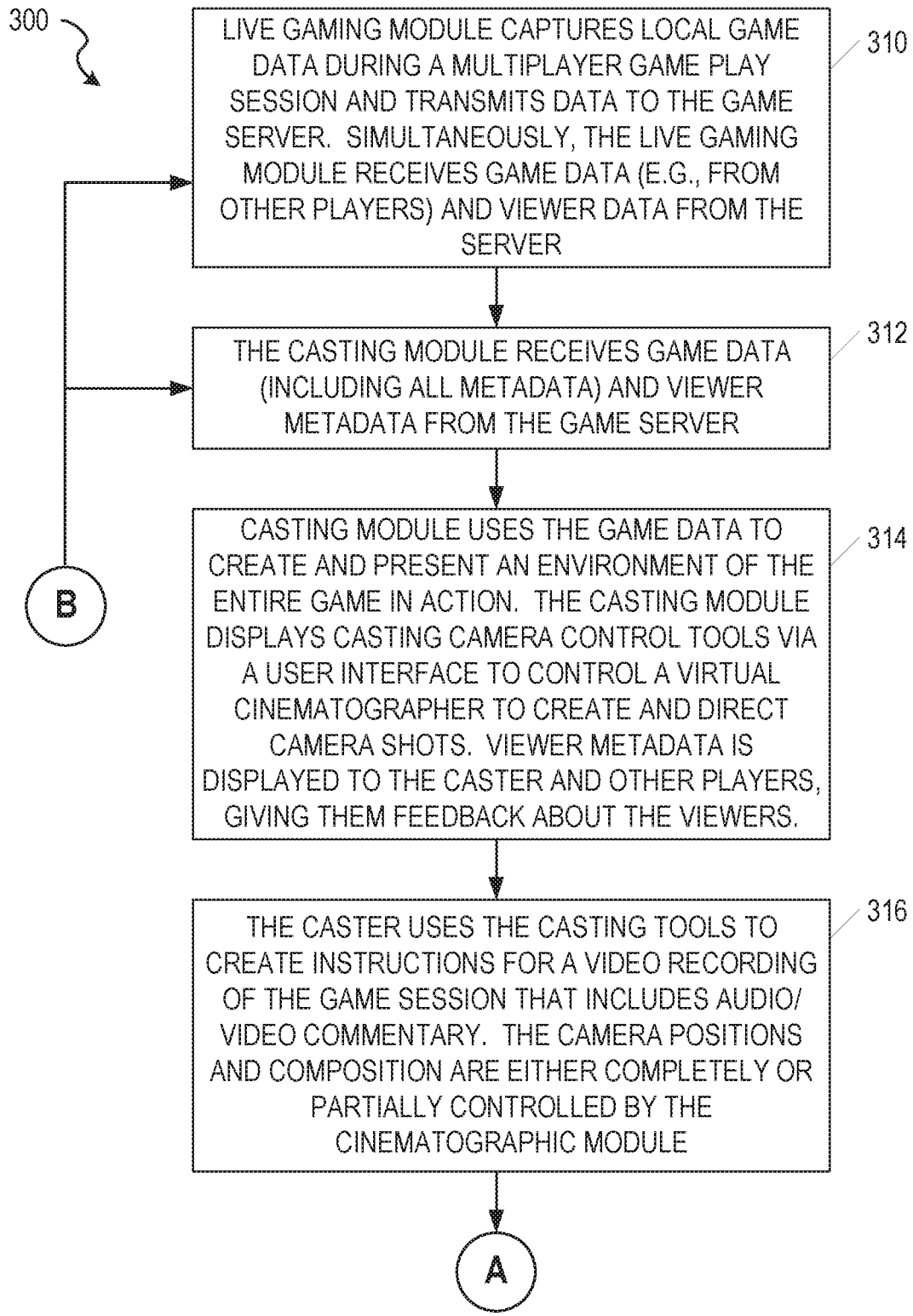
FIGS. 3A and 3B illustrate an example method for creating high definition broadcast content of eSport games for distribution and presentation to viewers over video sharing sites, in accordance with an embodiment.
Figure 3B:
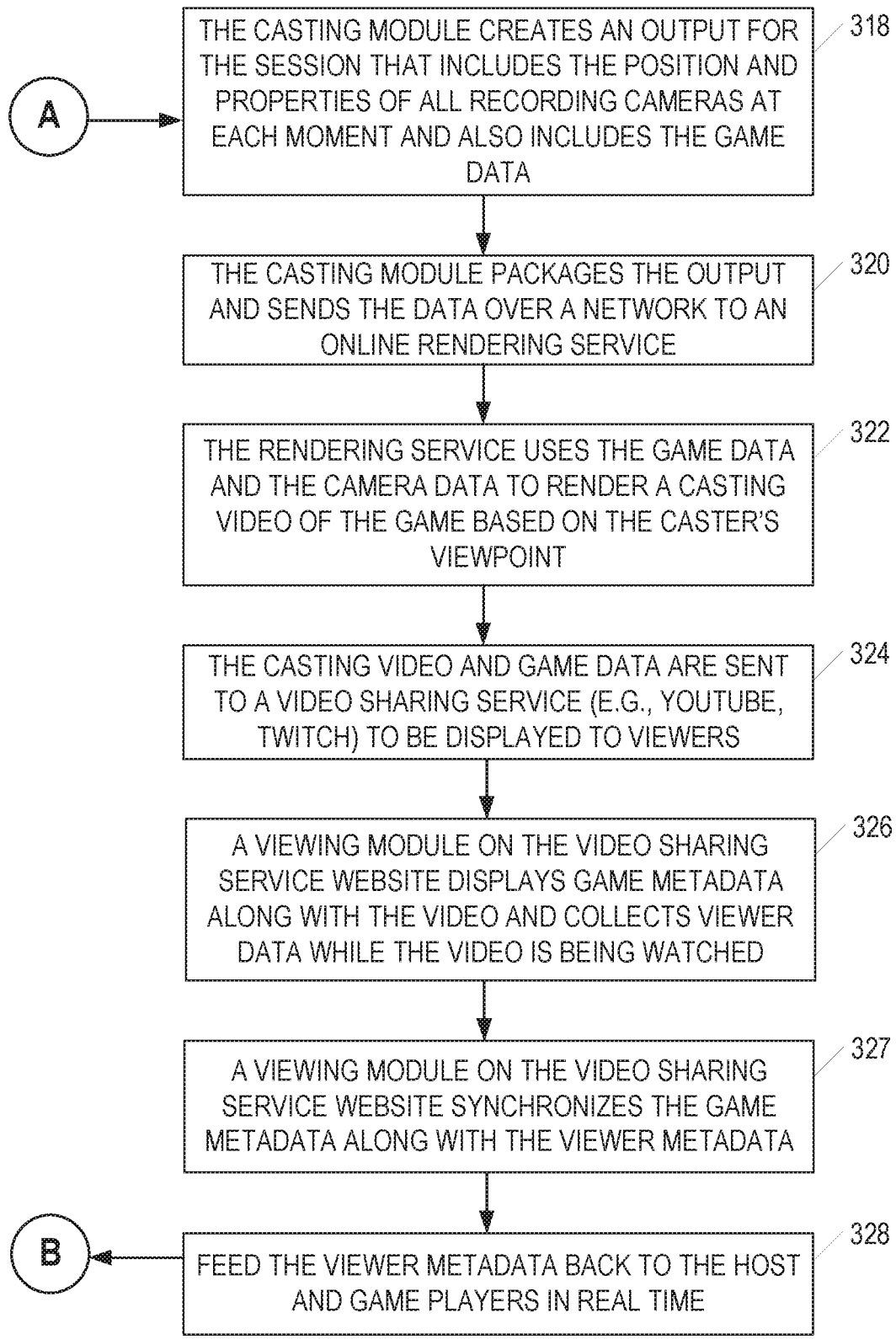

FIGS. 3A and 3B illustrate an example method for creating high quality broadcast content of eSport games for distribution and presentation to viewers 242 over video sharing sites 240 and viewers 232 on a viewer device 230. In the example embodiment, the method 300 is performed by the eSport system 200 in the networked environment illustrated in FIG. 2A and FIG. 2B. The method 300 is performed as the players 222 actively play the online game using the live gaming modules 142 in their respective player devices 220. At operation 310, the live gaming module 142 records and transmits user inputs from user input devices 106 (e.g., from joystick, keyboard, mouse, head mounted displays, hand tracking devices, and so forth) to the game server 250. The game server 250 uses the game data received from all players 222 to construct the authoritative version of the game and then to distribute the game data from this authoritative game back to all the user devices 220. The live gaming module 142 runs game code locally to implement client-side prediction in order to reduce network latency effects that occur with the communication between client and server. The live gaming module 142 also runs gaming code to integrate game data from the server 250 (e.g., game data from other remote player devices 220 and from the authoritative game on the server 250) with local game data and display the combined data on the display device 104. The live gaming module 142 also receives viewer metadata from the game server 250 and displays this data to the player 222.

At operation 312, in the example embodiment, the casting module 144 on the casting device 210 receives game data (including all game metadata, and viewer metadata) from the game server 250. The casting module 144 receives the game data (including the game metadata) and viewer metadata at operation 312 and uses the game data from the online game servers 250 to create and display a local version of the game to the caster 212 at operation 314. The casting module 144 uses the game data to create and present an environment of the entire game in action. The casting module 144 displays casting camera control tools via a user interface to control a virtual cinematographer (e.g. via the cinematographic module 148) to create and direct camera shots. The cinematographic module 148 and the casting module 144 use the game metadata to create and populate the camera control tools. Additionally, viewer metadata is displayed to the caster 212 and other players 222 giving them feedback about the viewers 232, 242. The casting module 144 displays casting tools to the caster 212 via a graphical user interface (GUI). The casting tools allow the caster 212 to control the cameras within the game environment, create (e.g. record), and transmit (e.g. broadcast) a custom version (e.g. including the camera control data from the caster) of the eSport session over the network 280. The tools include user interface (UI) elements that allow the caster 212 to, for example, view the eSport session from any existing game camera, create new cameras within the game to view the eSport session from any position, and engage a cinematographic module 148 to help control the cameras. The camera positions and screen compositions may be completely or partially controlled by the cinematographic module 148. Throughout the description herein, the term 'composition' and 'compositional' refers to the placement or arrangement of visual elements in a screen shot (e.g. in a video shot of an eSport game or of a 3D scene). The casting module 144 uses the game metadata and the cinematographic module 148 to control the cameras in the game in order to create high quality video of the eSport session. The cinematographic module 148 uses automatic composition to compose shots of the game action using the directions from the caster. The automatic composition used by the cinematographic module 148 can be rule based (e.g. using cinematography composition rules) and can be controlled by artificial intelligence. In accordance with an embodiment, each game would have data and instructions defining the types of angles and shots available for each character and scenario (e.g. the data and instructions could be determined by a game developer at game creation time). Upon play, the caster would be able to select from the available different shot styles—close up, wide, drone shot, security camera, follow camera, etc., and of different subjects or events—character A, kill shot, level up, sprinting, etc. The caster would use the casting device 210 for the rapid selection of camera type and subject/event which would be executed by the cinematographic module 148 to yield a good shot in any situation. At operation 316, the casting module 144 also records real-time audio and video commentary from the caster for the eSport session video. At operation 318, the casting module 144 creates an output for the session that includes the position and properties of all recording cameras (referred to below as camera metadata) at each moment along with real-time audio and video commentary from the caster and which includes the game data. In some embodiments, the casting module output may include all of the camera positions and orientations and lens settings for each frame. In some embodiments, higher-level camera commands may be sent (e.g., 'close up shot on player X', 'wide shot on player Y'). As such, the cinematographic module 148 may be utilized to process the higher-level commands. In some embodiments, the online rendering service 260 may include the cinematographic module 148 such as to process the higher-level commands. In some embodiments, the online game server 250 may transmit the game data directly to the online rendering service 260, thereby reducing latency.

In the example embodiment, at operation 320, the casting module 144 packages the output and sends the data over the network 280 to the online rendering service 260. At operation 322, the rendering service 260 uses the game data and the camera metadata to render a casting video (e.g., a video stream) of the game using the compositional camera shots that were chosen by the caster 212 and created by the cinematographic module 148. At operation 324, the rendered casting video and game data are sent to the video sharing service 240 to be displayed to the viewers 242. At operation 326, a viewing module on the video sharing service 240 (not separately depicted, but may be similar to the viewing module 146) displays game metadata along with the casting video and collects viewer metadata while the video is being displayed. The video sharing service 240 receives and displays the casting video and game metadata (e.g., including all caster metadata). The viewing module 146 uses the metadata to display information not traditionally available in the video feed of a multiplayer game (e.g., game version, level, characters active on current screen, mission progression, game state, hours played, purchases, and so forth). The cinematographic module 148 may use the metadata to display information such as, for example, current subject, on screen animations, lens type (e.g., tele, normal, wide), camera angle, and so forth. At operation 327, the viewing module synchronizes the game data and the viewer metadata.

At operation 328, in the example embodiment, the viewing module 146 on the video sharing service 240 also collects data from the viewer via a user interface and sends the data (e.g. viewer metadata) over the network 280 in real-time to the online game servers 250 for distribution to eSport devices (including player devices 220, casting devices 210, viewer devices 230, and viewing module 146 on video sharing sites 240) for game casters 212 and game players 222. In some embodiments, the online game server 250 may also collect and store the viewer metadata for later processing. The live gaming module 142 in the player devices 220 can use the viewer metadata to display user information during a session and to influence the game play. Similarly, the live gaming module 142 in the casting device 210 can use the viewer metadata to display viewer information during a session and to influence the caster 212's recording of the eSport session.

In some embodiments, the rendering services provided by the online rendering service 260 may be provided by a local rendering module (not separately depicted) on the casting device 210. In other words, operations 320, 322, and 324 may be performed locally on the casting device 210 by the local rendering module.

In some embodiments, the broadcast content generated by the method 300 may be viewed locally by the caster 212. In other words, operations 324, 326, 327, and 328 may be performed locally on the casting device 210 by the viewing module 146. As such, the caster 212 also acts as the viewer 242 and 232. In such an embodiment the caster 212 is similar to a viewer 232 and the casting device 210 is similar to the viewer device 230 such that the viewer 232 can directly control the cameras with the cinematographic module 148 and directly view the resulting video.

In some embodiments, the human caster 212 may be replaced with an automatic version of the cinematographic module 148 executing on the casting device 210 and performing operations 314 and 316. In other words, the automatic cinematographic module 148 receives game data and viewer metadata from the game server 250. The automatic cinematographic module 148 uses the game data and viewer metadata to create a local version of the game (e.g., using a live gaming module 142 on the casting device). The automatic cinematographic module 148 contains an artificial intelligence (AI)-controlled cinematographer that uses artificial intelligence (e.g., machine learning and neural networks) to choose and compose shots in order to create a casting video. The automatic cinematographic module 148 creates an output for the session that includes the position and properties of the recording camera at each moment (e.g., camera X with properties for time 1, camera X with properties for time 2, camera Y with properties for time 3, etc.). The casting module 144 packages the camera metadata with the game data and sends the data over a network to an online rendering service 260. The rendering service 260 uses the game data and the camera metadata to render a casting video of the game based on the automatic cinematographic module 148 instructions. The casting video and game data are sent to the video sharing service 240 to be displayed to viewers 242. A special viewing module on the video sharing service website displays game metadata along with the casting video and collects viewer metadata while the video is being displayed. In accordance with operation 328, the viewer metadata is sent from the viewing module 146 on the video sharing site 240 to the automatic cinematographic module 148 on the casting device 210. The automatic cinematographic module 148 in the casting device 210 can use the viewer metadata to influence the recording of the eSport session.

In accordance with an embodiment, when the automatic cinematographic module 148 receives game data from the game server 250, the automatic cinematographic module 148 delays the output (e.g., to the rendering service 260). The delay could be any amount of time, but a typical delay would be 2 or 3 seconds. The result of the delay is that the automatic cinematographic module 148 has real-time data from the game server 250 while any viewers (e.g. a caster 212 via a casting device 210, a viewer 242 via a video sharing site 240, and a viewer 232 via a viewer device 230)

see a slightly delayed version of the game video. This allows the cameras (via the automatic cinematographer module 148) to 'see into the future' for the amount of the delay. During the delay, the automatic cinematographer module 148, searches the game data for events (e.g., an explosion, death of a player, an ambush, shots fired at a player, etc.) and arranges (e.g., via positioning and composing) one or more cameras in the game environment to cover any discovered events and then cut to a camera shot of the event before it happens (e.g., before it is seen by a viewer/caster) and therefore creating a properly positioned and composed shot of events which are just about to occur from the viewer's perspective. From the point of view of a viewer/caster, the camera always arrives just before the action of the event and provides the viewer with a good view of the action surrounding the event.

The delay allows game developers to prioritize any key game events (e.g., events that are defined as important by the developers during game creation and events that are determined as important by artificial intelligence at runtime) within their game. The delay is also useful when watching a live real-world event (e.g. a football game, hockey game, soccer game, including non-sporting live real-world events) since the delay allows artificial intelligence or live event broadcasters to determine and tag specific actions as important. It also allows for viewers 232, 242 or casters 212 to choose whether the automatic cinematography module 148 is to search for the game events and actions and adjust the cinematography accordingly, or to ignore the game events and actions. In other words, the automatic cinematographic module 148 may have a 'delay mode' whereby having the delay mode on would have the module 148 film (e.g. position, compose and cut cameras) and display a game according to the game events and actions. For example, during a game or live real-world event, a viewer 232, 242 or caster 212 can choose their preferred camera types (e.g. "Close up on player #3") for default filming and the automatic cinematographic module 148 will cut away from this default camera type if a high-priority event or action occurs. Alternatively, having the delay mode off would have the module 148 ignore the events and actions while filming the game. The delay is useful since one of the largest issues with eSports viewing is how to best present the game to all the viewers.

Figure 3C:
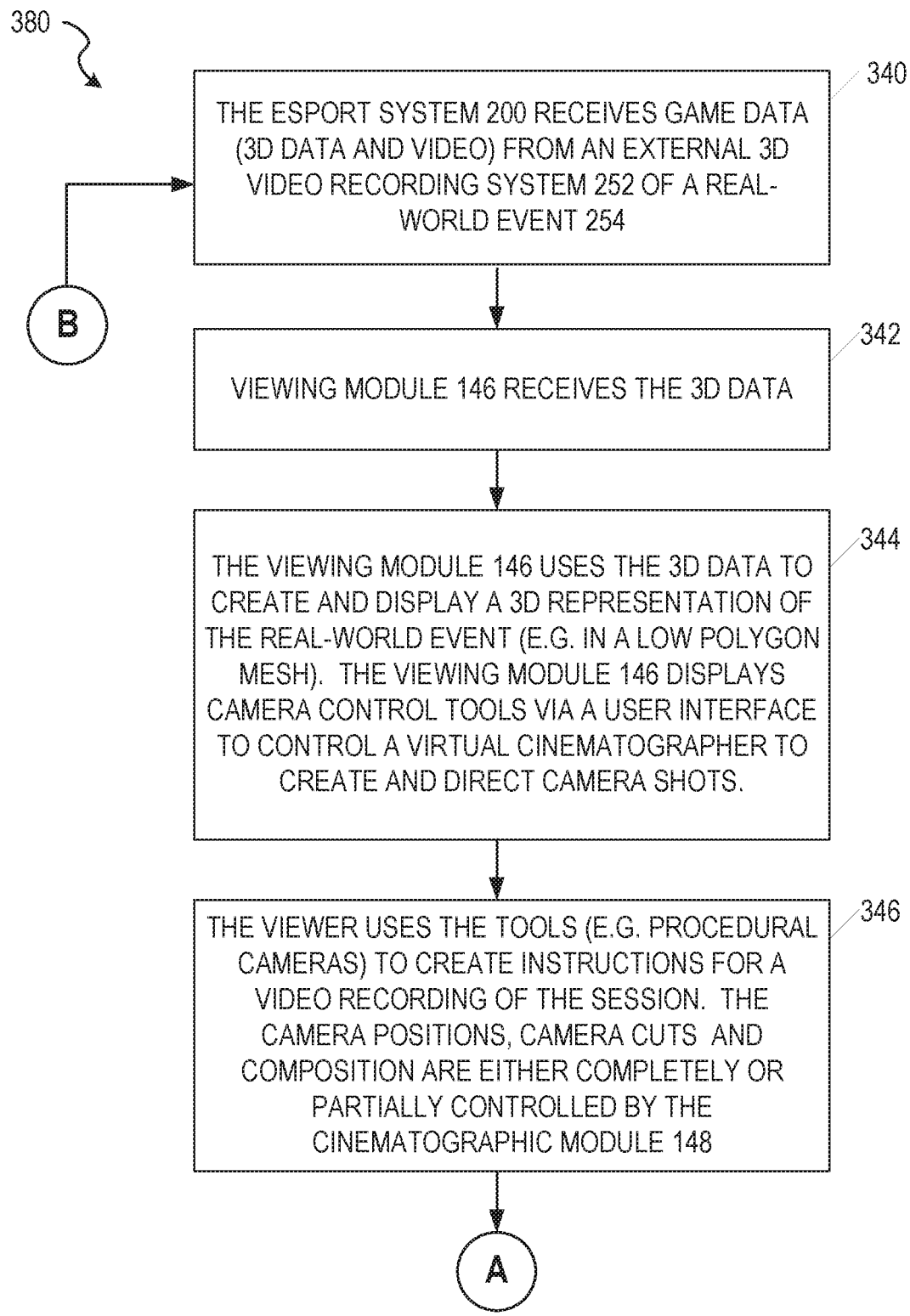
FIGS. 3C and 3D illustrate an example method for displaying and controlling the cinematography for high definition broadcast content of eSports events, in accordance with an embodiment.
Figure 3D:
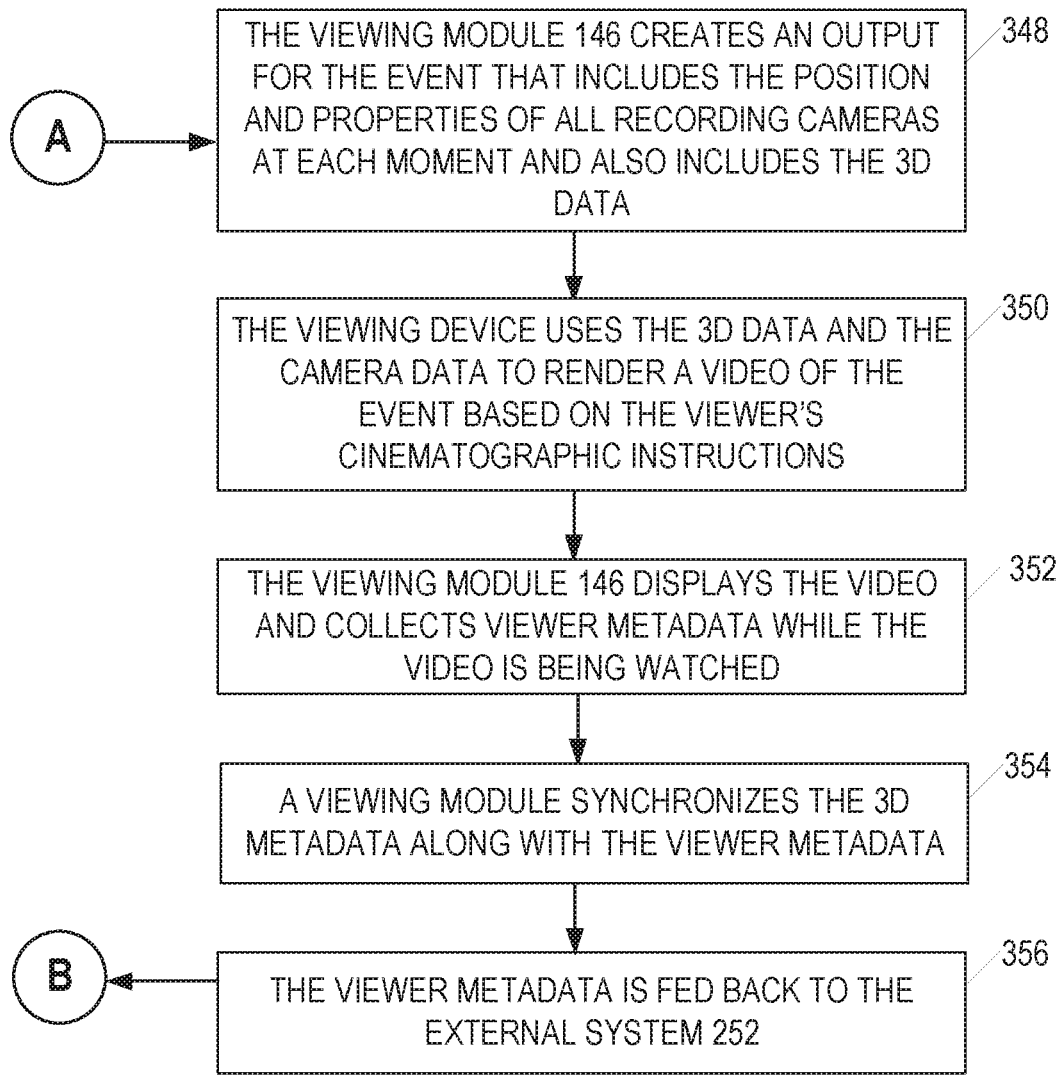

FIGS. 3C and 3D illustrate an example method for controlling the cinematographic viewing of high quality broadcast content of a live eSport event (e.g. a football game) on a viewer device 230. In the example embodiment, the method 380 is performed by the eSport system 200 in the networked environment illustrated in FIG. 2B. At operation 340, the eSport system 200 receives game data (including 3D data and video) from an external 3D video recording system 252 wherein the game data is from the recording of a real-world event 254. In the embodiment, the term game data includes 3D data and video from the real-world event 254. At operation 342, the viewing module 146 receives the game data. At operation 344, the viewing module 146 uses the game data to create and display a 3D representation of the real-world event. The 3D representation can have a high or low polygon count mesh and can have high or low resolution texturing. The viewing module 146 displays camera control tools for the viewer via a user interface. The control tools are used by the viewer to control a virtual cinematographer to create and direct camera shots in order to create a video. At operation 346, the viewer uses the tools (e.g., procedural cameras) to create instructions for a video recording of the event 254. The camera positions, camera cuts, and composition are either completely or partially controlled by the cinematographic module 148. At operation 348, the viewing module 146 creates an output for the event that includes the position and properties of all recording cameras at each moment (e.g., camera data) and also includes the 3D data. At operation 350, the viewing device uses the 3D data from the game data and the camera data to render a video of the event based on the viewer's cinematographic instructions. In accordance with another embodiment, the viewing device packages and sends the game data and camera data to an external rendering service for rendering. At operation 352, the viewing module 146 displays the video and collects viewer metadata while the video is being watched. At operation 354, the viewing module synchronizes the game data along with the viewer metadata. At operation 356, the viewer metadata is fed back to the external system 252 (e.g. real-time).

Figure 4:
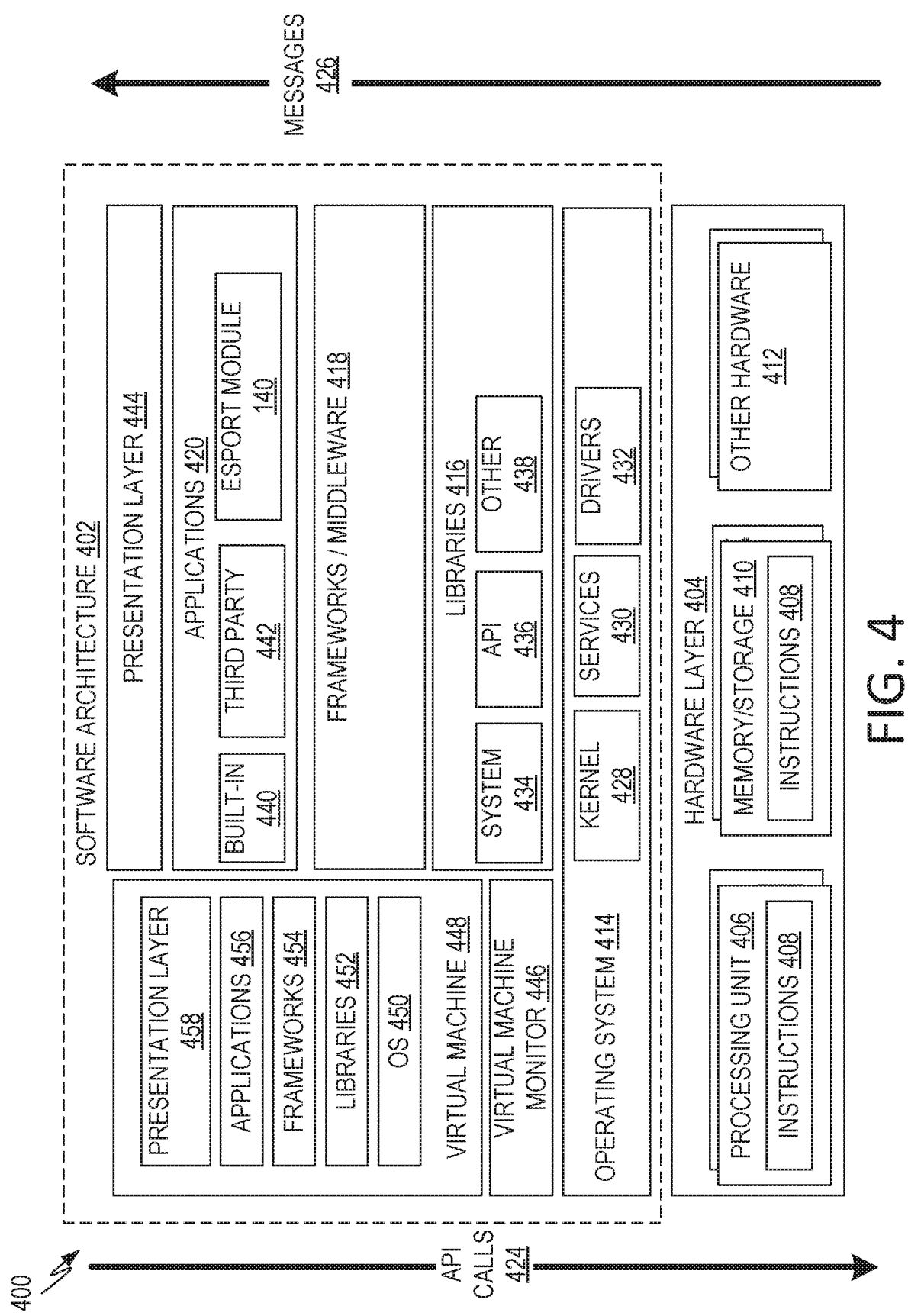
FIG. 4 is a block diagram illustrating an example software architecture, which may be used in conjunction with various hardware architectures herein described, in accordance with an embodiment.

FIG. 4 is a block diagram illustrating an example software architecture 402, which may be used in conjunction with various hardware architectures herein described. FIG. 4 is a non-limiting example of a software architecture and it will be appreciated that many other architectures may be implemented to facilitate the functionality described herein. The software architecture 402 may execute on hardware such as machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 having associated executable instructions 408. The executable instructions 408 represent the executable instructions of the software architecture 402, including implementation of the methods, modules and so forth described herein. The hardware layer 404 also includes memory and/or storage modules shown as memory/storage 410, which also have the executable instructions 408. The hardware layer 404 may also comprise other hardware 412.

In the example architecture of FIG. 4, the software architecture 402 may be conceptualized as a stack of layers where each layer provides particular functionality. For example, the software architecture 402 may include layers such as an operating system 414, libraries 416, frameworks or middleware 418, applications 420 and a presentation layer 444. Operationally, the applications 420 and/or other components within the layers may invoke application programming interface (API) calls 424 through the software stack and receive a response as messages 426. The layers illustrated are representative in nature and not all software architectures have all layers. For example, some mobile or special purpose operating systems may not provide the frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be used by the applications 420 and/or other components and/or layers. The libraries 416 typically provide functionality that allows other software modules to perform tasks in an easier fashion than by interfacing directly with the underlying operating system 414 functionality (e.g., kernel 428, services 430, and/or drivers 432). The libraries 416 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) provide a higher-level common infrastructure that may be used by the applications 420 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be used by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. The third-party applications 442 may include an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 442 may invoke the API calls 424 provided by the mobile operating system such as the operating system 414 to facilitate functionality described herein.

The applications 420 may use built-in operating system functions (e.g., kernel 428, services 430, and/or drivers 432), libraries 416, or frameworks/middleware 418 to create user interfaces to interact with users of the system. Alternatively, or additionally, in some systems interactions with a user may occur through a presentation layer, such as the presentation layer 444. In these systems, the application/module "logic" can be separated from the aspects of the application/module that interact with a user.

Some software architectures use virtual machines. In the example of FIG. 4, this is illustrated by a virtual machine 448. The virtual machine 448 creates a software environment where applications/modules can execute as if they were executing on a hardware machine (such as the machine 500 of FIG. 5, for example). The virtual machine 448 is casted by a caster operating system (e.g., operating system 414 in FIG. 4) and typically, although not always, has a virtual machine monitor 446, which manages the operation of the virtual machine 448 as well as the interface with the caster operating system (e.g., operating system 414). A software architecture executes within the virtual machine 448 such as an operating system (OS) 450, libraries 452, frameworks 454, applications 456, and/or a presentation layer 458. These layers of software architecture executing within the virtual machine 448 can be the same as corresponding layers previously described or may be different.

Figure 5:
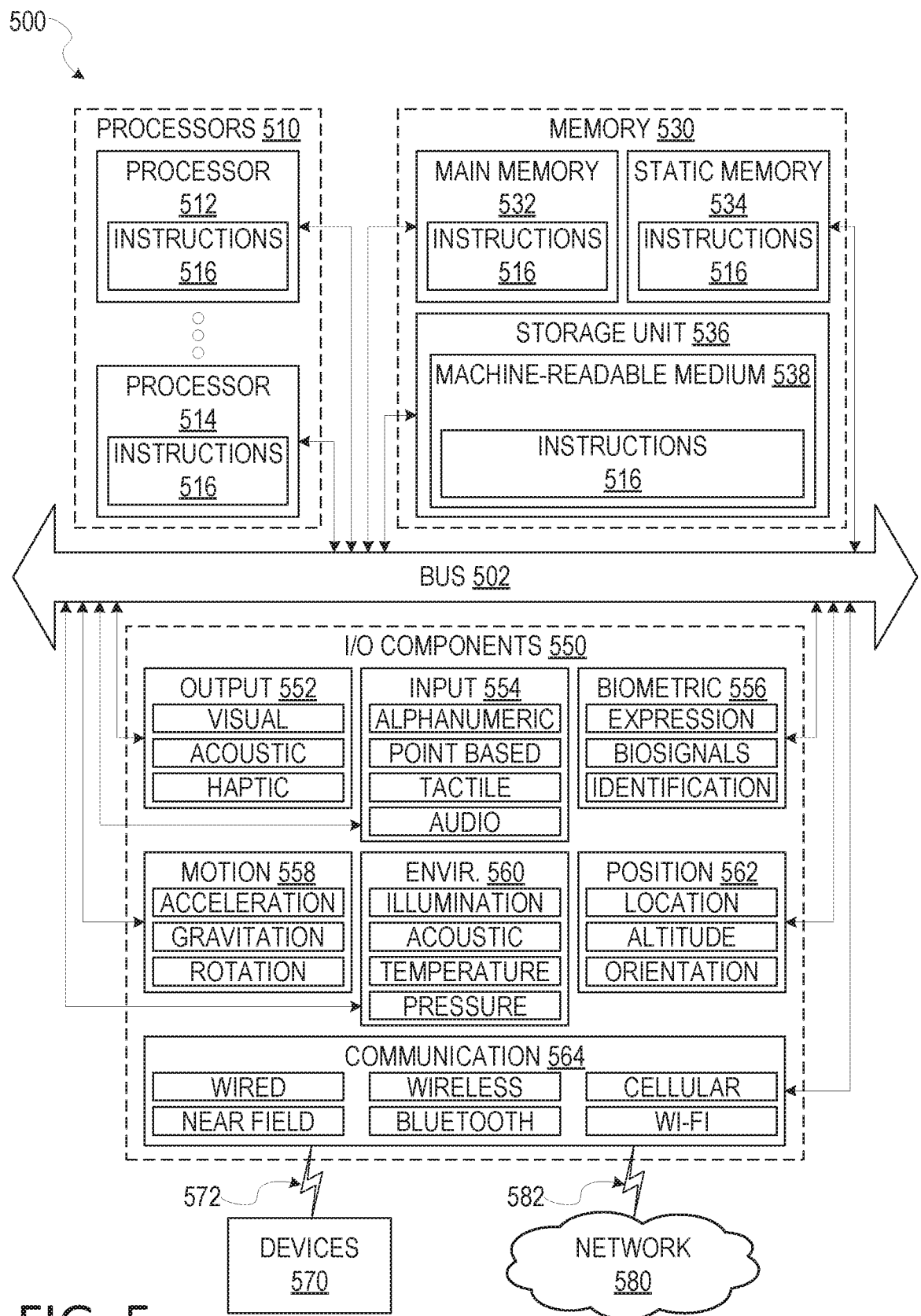
FIG. 5 is a block diagram illustrating components of a machine, according to some example embodiments, able to read instructions from a machine-readable medium (e.g., a machine-readable storage medium) and perform any one or more of the methodologies discussed herein, in accordance with an embodiment.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. As such, the instructions 516 may be used to implement modules or components described herein. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that may execute the instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiples cores, or any combination thereof.

The memory 530 may include a memory, such as a main memory 532, a static memory 534, or other memory storage, and a storage unit 536, both accessible to the processors 510 such as via the bus 502. The storage unit 536 and memory 532, 534 store the instructions 516 embodying any one or more of the methodologies or functions described herein. The instructions 516 may also reside, completely or partially, within the memory 532, 534, within the storage unit 536, within at least one of the processors 510 (e.g., within the processor's cache memory), or any suitable combination thereof, during execution thereof by the machine 500. Accordingly, the memory 532, 534, the storage unit 536, and the memory of processors 510 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific input/output (I/O) components 550 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 550 may include many other components that are not shown in FIG. 5. The input/output (I/O) components 550 are grouped according to functionality merely for simplifying the following discussion and the grouping is in no way limiting. In various example embodiments, the input/output (I/O) components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 550 may include biometric components 556, motion components 558, environment components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental environment components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g, infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 550 may include communication components 564 operable to couple the machine 500 to a network 580 or devices 570 via a coupling 582 and a coupling 572 respectively. For example, the communication components 564 may include a network interface component or other suitable device to interface with the network 580. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more computer processors;
   one or more computer memories;
   one or more modules incorporated into the one or more computer memories, the one or more modules configuring the one or more computer processors to perform operations for generating a delayed version of a video transmission of a live event for presentation on at least one viewer device, the operations comprising:
   adding a time delay within the transmission of the video transmission;
   determining, during the delay, a preferred cinematography around an incident occurring within the live event based on an analysis of data describing the live event, wherein the preferred cinematography includes at least one of a camera angle, a camera position, and a camera shot composition;
   creating additional data to describe the preferred cinematography by invoking an automatic cinematography module, the automatic cinematography module performing additional operations, the additional operations including selecting the incident from a plurality of incidents within the live event data and generating at least one virtual camera shot composition of the incident;
   integrating the additional data into the data during the time delay for adjusting of cinematography of the video transmission for presentation on the at least one viewer device.

2. The system of claim 1, wherein the adjusting of cinematography includes cutting to the preferred cinematography shot before the incident occurs during the presentation.

3. The system of claim 1, wherein the incident is determined as important with respect to the plurality of incidents within the live event using a set of predefined cinematography rules.

4. The system of claim 1, wherein the incident is determined as important with respect to the plurality of incidents by an artificial intelligence agent.

5. The system of claim 1, wherein the data includes three-dimensional modeling data associated with the live event, the three-dimensional modeling data including one or more of the following: 3D mesh data, texture data, and animation data.

6. The system of claim 1, wherein the live event is a multiplayer video game and the data includes data describing a state of the multiplayer video game.

7. The system of claim 6, wherein the operations further comprise:
   receiving game data collected from a plurality of player devices, the game data representing a plurality of actions performed by a plurality of players associated with the plurality of player devices; and
   analyzing the plurality of actions to determine the incident as important with respect to the plurality of incidents.

8. The system of claim 1, wherein the live event is a broadcasting of a live sporting event.

9. The system of claim 1, wherein the adjusting of the cinematography is performed on the viewer device prior to displaying the presentation.

10. A non-transitory machine-readable medium storing a set of instructions that, when executing by one or more computer processors, cause the one or more computer processors to perform operations for generating a delayed version of a video transmission of a live event for presentation on at least one viewer device, the operations comprising:
    adding a time delay within the transmission of the video transmission;
    determining, during the delay, a preferred cinematography around an incident occurring within the live event based on an analysis of data describing the live event, wherein the preferred cinematography includes at least one of a camera angle, a camera position, and a camera shot composition;
    creating additional data to describe the preferred cinematography by invoking an automatic cinematography module, the automatic cinematography module performing additional operations, the additional operations including selecting the incident from a plurality of incidents within the live event data and generating at least one virtual camera shot composition of the incident;

integrating the additional data into the data during the time delay for adjusting of cinematography of the video transmission for presentation on the at least one viewer device.

11. The non-transitory machine-readable medium of claim 10, wherein the adjusting of cinematography includes cutting to the preferred cinematography shot before the incident occurs during the presentation.

12. The non-transitory machine-readable medium of claim 10, wherein the incident is determined as important with respect to the plurality of incidents within the live event using a set of predefined cinematography rules.

13. The non-transitory machine-readable medium of claim 10, wherein the incident is determined as important with respect to the plurality of incidents by an artificial intelligence agent.

14. The non-transitory machine-readable medium of claim 10, wherein the data includes three-dimensional modeling data associated with the live event, the three-dimensional modeling data including one or more of the following: 3D mesh data, texture data, and animation data.

15. The non-transitory machine-readable medium of claim 10, wherein the live event is a multiplayer video game and the data includes data describing a state of the multiplayer video game.

16. The non-transitory machine-readable medium of claim 15, wherein the operations further comprise:

receiving game data collected from a plurality of player devices, the game data representing a plurality of actions performed by a plurality of players associated with the plurality of player devices; and analyzing the plurality of actions to determine the incident as important with respect to the plurality of incidents.

17. The non-transitory machine-readable medium of claim 10, wherein the live event is a broadcasting of a live sporting event.

18. The non-transitory machine-readable medium of claim 10, wherein the adjusting of the cinematography is performed on the viewer device prior to displaying the presentation.

19. A method comprising:

performing operations for generating a delayed version of a video transmission of a live event for presentation on at least one viewer device, the operations comprising:

adding a time delay within the transmission of the video transmission;

determining, during the delay, a preferred cinematography around an incident occurring within the live event based on an analysis of data describing the live event, wherein the preferred cinematography includes at least one of a camera angle, a camera position, and a camera shot composition;

creating additional data to describe the preferred cinematography by invoking an automatic cinematography module, the automatic cinematography module performing additional operations, the additional operations including selecting the incident from a plurality of incidents within the live event data and generating at least one virtual camera shot composition of the incident;

integrating the additional data into the data during the time delay for adjusting of cinematography of the video transmission for presentation on the at least one viewer device.

20. The method of claim 19, wherein the adjusting of cinematography includes cutting to the preferred cinematography shot before the incident occurs during the presentation.

* * * * *